(12) United States Patent
Arcangeli et al.

(10) Patent No.: US 11,467,974 B2
(45) Date of Patent: Oct. 11, 2022

(54) HOST ADDRESS SPACE IDENTIFIER FOR NON-UNIFORM MEMORY ACCESS LOCALITY IN VIRTUAL MACHINES

(71) Applicant: Red Hat, Inc., Raleigh, NC (US)

(72) Inventors: Andrea Arcangeli, Imola (IT); Michael Tsirkin, Lexington, CA (US)

(73) Assignee: Red Hat, Inc., Raleigh, NC (US)

( * ) Notice: Subject to any disclaimer, the term of this patent is extended or adjusted under 35 U.S.C. 154(b) by 95 days.

(21) Appl. No.: 16/841,663

(22) Filed: Apr. 6, 2020

(65) Prior Publication Data

US 2020/0233813 A1    Jul. 23, 2020

Related U.S. Application Data

(63) Continuation of application No. 15/831,724, filed on Dec. 5, 2017, now Pat. No. 10,613,990.

(51) Int. Cl.
  *G06F 12/10*   (2016.01)
  *G06F 12/1009* (2016.01)
  *G06F 9/455*   (2018.01)
  *G06F 12/02*   (2006.01)

(52) U.S. Cl.
  CPC ...... *G06F 12/1009* (2013.01); *G06F 9/45545* (2013.01); *G06F 12/0292* (2013.01); *G06F 2009/45583* (2013.01)

(58) Field of Classification Search
  CPC ............. G06F 12/1009; G06F 12/0292; G06F 9/45545
  See application file for complete search history.

(56) References Cited

U.S. PATENT DOCUMENTS

| | | | |
|---|---|---|---|
| 6,075,938 A | 6/2000 | Bugnion et al. | |
| 8,307,191 B1 | 11/2012 | Jain | |
| 8,417,913 B2 | 4/2013 | Elnozahy et al. | |
| 8,719,545 B2 | 5/2014 | Pandey et al. | |
| 9,229,878 B2 | 1/2016 | Hod et al. | |
| 9,317,441 B2 * | 4/2016 | Schoenberg | G06F 12/1027 |
| 10,447,728 B1 * | 10/2019 | Steinberg | H04L 63/20 |

(Continued)

OTHER PUBLICATIONS

L. Zhou, S. Wu, X. Shi and H. Jin, "An Approach to Use Cluster-Wide Free Memory in Virtual Environment", 2011 Sixth Annual Chinagrid Conference, 2011, pp. 163-167.*

(Continued)

*Primary Examiner* — Pierre Michel Bataille
(74) *Attorney, Agent, or Firm* — Lowenstein Sandler LLP

(57) ABSTRACT

Aspects of the disclosure provide for implementing host address space identifiers for non-uniform memory access (NUMA) locality in virtual machines. A method of the disclosure includes determining, by a virtual machine (VM) executed by a processing device and managed by a hypervisor, that a memory page of the guest is to be moved from a first virtual non-uniform memory access (NUMA) node of the VM to a second virtual NUMA node of the VM. The method further includes updating, by the VM in a guest page table, upper bits of a guest physical address (GPA) of the memory page to include a host address space identifier (HASID) of the second virtual NUMA node, and causing an execution control to be transferred from the VM to the hypervisor due to a page fault resulting from attempting to access the updated GPA.

20 Claims, 11 Drawing Sheets

(56) References Cited

U.S. PATENT DOCUMENTS

| | | | |
|---|---|---|---|
| 2006/0161719 A1 | 7/2006 | Bennett et al. | |
| 2008/0155168 A1 | 6/2008 | Sheu et al. | |
| 2010/0251234 A1* | 9/2010 | Oshins | G06F 9/4856 718/1 |
| 2012/0089808 A1 | 4/2012 | Jang et al. | |
| 2014/0068603 A1* | 3/2014 | Tsirkin | G06F 9/45558 718/1 |
| 2014/0365738 A1* | 12/2014 | Hod | G06F 12/08 711/160 |
| 2015/0160962 A1* | 6/2015 | Borntraeger | G06F 12/1009 718/1 |
| 2016/0085571 A1 | 3/2016 | Kim et al. | |
| 2018/0032447 A1 | 2/2018 | Kaplan et al. | |
| 2018/0067866 A1 | 3/2018 | Shanbhogue et al. | |

OTHER PUBLICATIONS

Q. Luo, F. Xiao, Z. Ming, H. Li, J. Chen and J. Zhang, "Optimizing the Memory Management of a Virtual Machine Monitor on a NUMA System," in Computer, vol. 49, No. 6, pp. 66-74, Jun. 2016.*

D. S. Rao and K. Schwan, "vNUMA-mgr: Managing VM memory on NUMA platforms," 2010 International Conference on High Performance Computing, 2010, pp. 1-10.*

Cheng, Yuxia, Chen, Wenzhi, "A User-Level NUMA-Aware Scheduler for Optimizing Virtual Machine Performance", 2013, 15 pages.

Gelman, Len, "Electronic Engineering and Computing Technology", 2010, 1 page.

* cited by examiner

500

START

↓

Receive execution control from a guest managed by a hypervisor, where a page fault corresponding to a guest physical address (GPA) triggered an exit to the hypervisor from the guest
510

↓

Identify a host address space identifier (HASID) from the GPA
520

↓

Determine, in view of the HASID, whether to migrate a memory page associated with the GPA to a destination host non-uniform memory access (NUMA) node corresponding to the HASID
530

↓

Create a new page table entry for the GPA in a host page table of the hypervisor
540

↓

END

```
                    ┌─────────┐
                    │  START  │
                    └────┬────┘
                         ▼
┌─────────────────────────────────────────────────────────────────────┐
│ Receive, by a hypervisor, execution control from a virtual machine  │
│ (VM), where a page fault corresponding to a guest physical address  │
│ (GPA) triggered an exit to the hypervisor from the VM               │
│                                                                 710 │
└─────────────────────────────────┬───────────────────────────────────┘
                                  ▼
┌─────────────────────────────────────────────────────────────────────┐
│ Decode, by the hypervisor, the GPA to identify a host address space │
│ identifier (HASID) located in upper bits of the GPA                 │
│                                                                 720 │
└─────────────────────────────────┬───────────────────────────────────┘
                                  ▼
┌─────────────────────────────────────────────────────────────────────┐
│ Determine, by the hypervisor in view of the HASID, whether to       │
│ migrate a memory page associated with the GPA                       │
│                                                                 730 │
└─────────────────────────────────┬───────────────────────────────────┘
                                  ▼
┌─────────────────────────────────────────────────────────────────────┐
│ Create, by the hypervisor, a new page table entry for the GPA in a  │
│ host page table of the hypervisor                                   │
│                                                                 740 │
└─────────────────────────────────┬───────────────────────────────────┘
                                  ▼
                            ┌─────────┐
                            │   END   │
                            └─────────┘
```

```
                    ┌─────────┐
                    │  START  │
                    └────┬────┘
                         │
┌────────────────────────┴────────────────────────┐
│ Determine, by a virtual machine (VM) executed by a processing device and
│ managed by a hypervisor, that a memory page of the VM should be moved
│ from a first virtual non-uniform memory access (NUMA) node of the VM to a
│ second virtual NUMA node of the VM
│                                              1010
└────────────────────────┬────────────────────────┘
                         │
┌────────────────────────┴────────────────────────┐
│ Reference a NUMA node locality table to identify an offset associated with a
│ host address space identifier (HASID) corresponding to the second virtual
│ NUMA node with the second virtual NUMA node
│                                              1020
└────────────────────────┬────────────────────────┘
                         │
┌────────────────────────┴────────────────────────┐
│ Adjust an address of the memory page by the offset
│                                              1030
└────────────────────────┬────────────────────────┘
                         │
┌────────────────────────┴────────────────────────┐
│ Store the adjusted address as a guest physical address (GPA) for the memory
│ page in a guest page table of the VM
│                                              1040
└────────────────────────┬────────────────────────┘
                         │
┌────────────────────────┴────────────────────────┐
│ Attempt to access the GPA for the memory page
│                                              1050
└────────────────────────┬────────────────────────┘
                         │
┌────────────────────────┴────────────────────────┐
│ Responsive to a page fault resulting from attempting to access the GPA, exit
│ from the guest to the hypervisor
│                                              1060
└────────────────────────┬────────────────────────┘
                         │
                    ┌────┴────┐
                    │   END   │
                    └─────────┘
```

FIG. 10

HOST ADDRESS SPACE IDENTIFIER FOR NON-UNIFORM MEMORY ACCESS LOCALITY IN VIRTUAL MACHINES

RELATED APPLICATIONS

This application is a continuation application of co-pending U.S. patent application Ser. No. 15/831,724, filed Dec. 5, 2017, which is herein incorporated by reference.

TECHNICAL FIELD

The implementations of the disclosure relate generally to non-uniform memory access (NUMA) systems and, more specifically, to methods and systems for host address space identifiers for non-uniform memory access (NUMA) locality in virtual machines (VMs).

BACKGROUND

Historically, memory on multi-processor computer systems was equally accessible by all central processing units (CPUs). This is known as uniform memory access. In uniform memory access systems, access times between CPUs and memory are the same no which CPU performs the operations. In a non-uniform memory access (NUMA) system, system memory is divided across NUMA nodes, which correspond to sockets or to a particular set of CPUs that have identical access latency to the local subset of system memory. In NUMA systems, regions of memory connected indirectly in a NUMA system (e.g., a processor accessing memory outside of its allocated NUMA node) may take longer to access than directly-connected regions. As such, parts of memory are faster if accessed by specific processor units.

An application executing in a NUMA system generally performs best when the threads of its processes are accessing memory on the same NUMA node as the threads are scheduled. Operating systems (OSes) optimize performance of such applications in NUMA systems by implementing automatic NUMA balancing. Automatic NUMA balancing moves tasks (which can be threads or processes) closed to the memory they are accessing. It can also move application data to memory closer to the tasks that reference it. This is done automatically by the OS kernel when automatic NUMA balancing is enabled on the system.

When a computing system is implemented as a virtualized computing system, automatic NUMA balancing can also be applied. A virtualized computing system can include one or more host machines and run one or more hypervisors on the host machines. Each hypervisor can support one or more virtual machines, with each of the virtual machines running one or more applications under a guest operating system.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 5 is a flow diagram illustrating a method for HASIDs for NUMA locality in VMs as applied by a hypervisor, according to an implementation of the disclosure;

FIG. 7 is a flow diagram illustrating a method for HASIDs using upper bits for NUMA locality in VMs as applied by a hypervisor, according to an implementation of the disclosure;

FIG. 10 is a flow diagram illustrating a method for HASIDs using address range lookup for NUMA locality in VMs as applied by a VM, according to an implementation of the disclosure.

DETAILED DESCRIPTION

Figure 1:
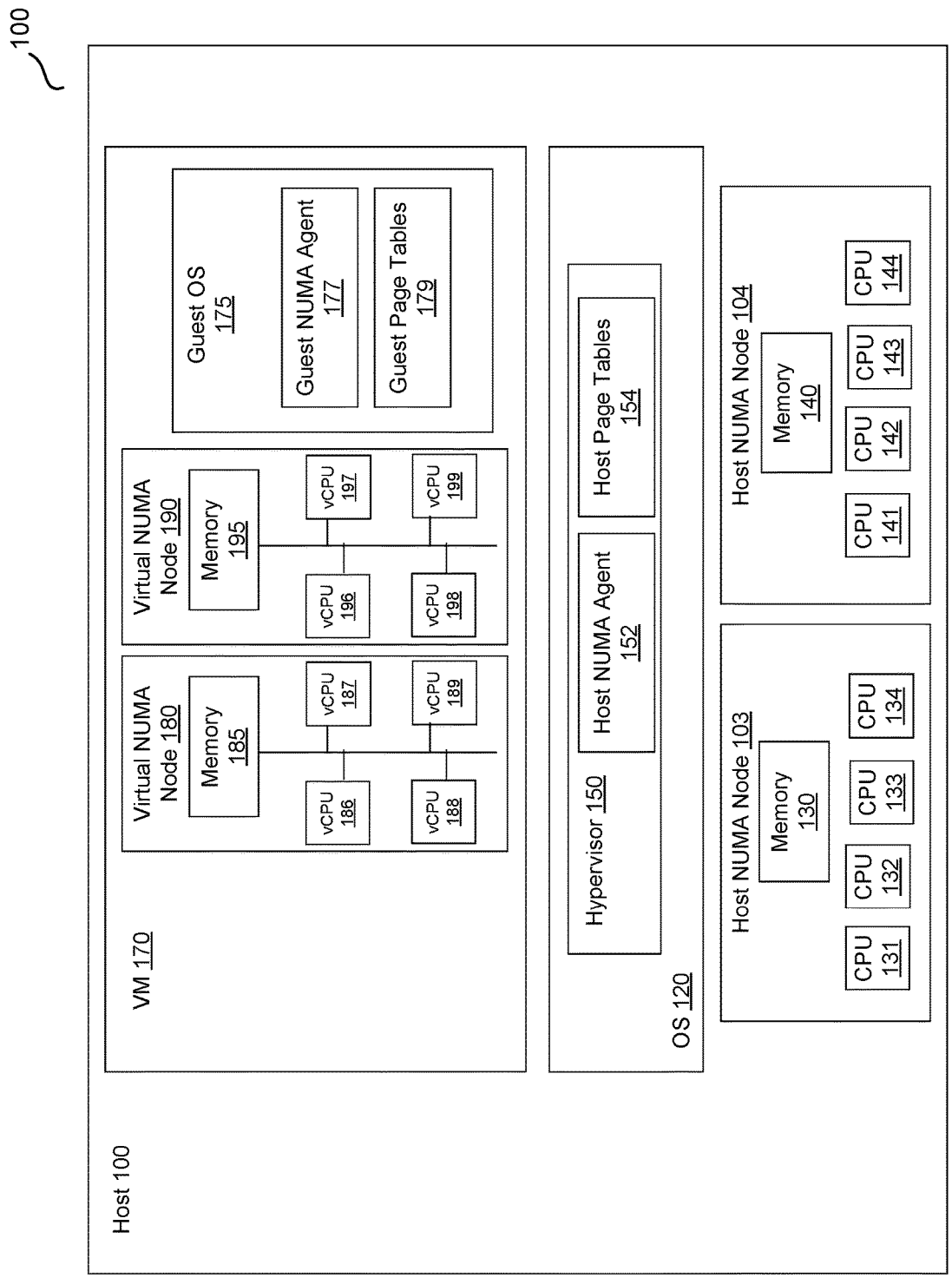
FIG. 1 is a block diagram illustrating example computer systems according to implementations of the disclosure.

Aspects of the disclosure provide for host address space identifiers for non-uniform memory access (NUMA) locality in virtual machines (VMs). Automatic NUMA balancing may be implemented by a hypervisor in a virtualization system and can include two components: moving data in memory near the processor that is accessing it, and moving a processor near memory it is accessing. However, this poses a unique challenge for virtualization systems. As the guest memory is a virtualized version of the physical memory of the host, the NUMA nodes of both the guest and host computer system may be managing the same portion of memory in terms of automatic NUMA balancing, which can lead to conflicts and inefficiencies. For example, if a guest observes that a given virtual CPU on a first virtual NUMA node is accessing a given data on a second virtual NUMA node, the guest may try to copy the data from the first virtual NUMA node to the second virtual NUMA node. However, this copy operation can take a significant amount of time, and during this time the hypervisor may change the NUMA locality of (e.g., assign to a particular NUMA node) the relevant vCPU or of the guest memory involved in the copy process.

Because of this undesirable result, conventional systems often disable automatic NUMA balancing on either the host machine or on the guest. This manual disabling can lead to sub-optimal performance of the host machine and/or guest as these components are not fully utilizing the performance benefits resulting from automatic NUMA balancing in a NUMA system. In addition, the NUMA system on the host machine or on the guest that has disabled automatic NUMA balancing may experience unbalanced NUMA nodes, resulting in degradation of system performance. As a result, users often attempt manual partitioning of a NUMA node. However, this manual partitioning can be time consuming and difficult. As such, disabled automatic NUMA balancing and manual partitioning result in significant roadblocks for virtualization system adoption of NUMA in computer systems.

Aspects of the disclosure address the above deficiencies by providing mechanisms (e.g., systems, methods, machine-readable media, etc.) for host address space identifiers (HASIDs) for NUMA locality in VMs. For example, the implementations described herein include technology that enhances NUMA systems in virtualized computer systems. In particular, guest memory can be mapped in the guest physical address space at multiple addresses, where each guest physical address (GPA) is identified by an HASID. Each HASID conceptually maps the corresponding GPA to a virtual NUMA node for the guest.

If the guest determines to move a memory page of the guest as part of an automatic NUMA balancing process, instead of copying the page to the destination virtual NUMA node, the guest updates the GPA of the memory page with the HASID of the destination virtual NUMA node. The HASID can be incorporated in the GPA and be provided as a "hint" to the hypervisor. The hypervisor may utilize the HASID as part of a determination of whether and where to copy a particular memory page (corresponding to the GPA) as part of automatic NUMA balancing. Utilization of the HASID as a hint to the hypervisor can automate NUMA placement in a synchronous and symbiotic manner for the hypervisor and guest, thus improving implementation of NUMA in virtualized systems and improving overall system performance.

FIG. 1 is a block diagram of an example 100 of a computer system according to some implementations of the disclosure. "Computer system" as used herein may be and/or include a system comprising one or more processors, one or more memory devices, and one or more input/output (I/O) interfaces.

As illustrated in FIG. 1, host computer system 100 may include one or more processors 131-134, 141-144 (e.g., central processing units (CPUs)) communicatively coupled to memory devices 103, 104. Local connections within host computer system 100, including connections between processors 131-134, 141-144 and memory devices 103, 104, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some implementations.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

As illustrated in FIG. 1, host computer system 100 may execute (run) one or more virtual machines (VMs) 170 by executing a software layer 150, often referred to as "hypervisor," above the hardware and below the virtual machines. In implementations of the disclosure, a "VM" may also be referred to as a "guest" and these terms may be used interchangeably herein. In certain implementations, hypervisor 150 may be a component of operating system 110 executed by the corresponding host computer system 100. Alternatively, hypervisor 150 may be provided by an application running under host operating system 120, or may run directly on the corresponding host computer system 100 without an operating system beneath it. Hypervisor 150 may abstract the physical layer, including processors, memory, I/O devices, etc. and present this abstraction to virtual machines 170 as virtual devices, including virtual processors, virtual memory, virtual I/O devices, etc. A hypervisor 150 may abstract the physical layer and present this abstraction to virtual machines 170 to use, by providing interfaces between the underlying hardware and virtual devices of virtual machines.

NUMA agents 152, 177 executing on the respective host computer system 100 may perform NUMA management functions for the virtual machine 170 in accordance with one or more aspects of the disclosure. In certain implementations, a host NUMA agent 152 may be implemented as a software component invoked by hypervisor 150. Alternatively, functions of host NUMA agent 152 may be performed by hypervisor 150. In certain implementations, a guest NUMA agent 177 may be implemented as a software component of a guest OS 175 invoked by virtual machine 170. Alternatively, functions of guest NUMA agent 177 may be performed by virtual machine 170. In some implementations, NUMA agents 152, 177 can implement one or more aspects of the disclosure as described in connection with FIGS. 2-10.

In one implementation, host computer system 100 may be communicatively coupled to a host controller (not shown) which may reside on a designated computer system or on the host computer system 100. Host controller may manage a plurality of virtual machines, including virtual machine 170. Host controller may create a virtual machine, delete a virtual machine, and perform any other virtual machine management functions.

In one implementation, host computer system 100 may be implemented as a NUMA system having multiple nodes, such as host NUMA nodes 103 and 104. Host NUMA nodes 103, 104 may correspond to a particular set of CPUs of host computer system 100 that have identical access latency to a local subset of memory of host computer system 100. As such, each host NUMA node 103, 104 may include processors and memory. In the example as shown in FIG. 1, each host NUMA node 103, 104 can include a quantity of memory and a number of CPU cores. For instance, host NUMA node 103 can include memory 130 and CPU cores CPU 131, CPU 132, CPU 133, and/or CPU 134. Host NUMA node 104 can include memory 140 and CPU cores CPU 141, CPU 142, CPU 143, and/or CPU 144. CPU cores communicatively coupled to memory devices within a node may perform local memory access. For example, CPU 131 may locally access memory 130 on host NUMA node 103 and non-locally access memory 140 on host NUMA node 104. Although two host NUMA nodes are shown for example purposes in FIG. 1, a NUMA system, such as host computer system 100, may include more than two host NUMA nodes.

As previously discussed, in NUMA systems, regions of memory connected indirectly in a NUMA system (e.g., a processor accessing memory outside of its allocated NUMA node) may take longer to access than directly-connected regions. As such, parts of memory are faster if accessed by specific processor units. Nodes may be communicatively coupled via inter-node connections directly and/or indirectly. Indirectly connected nodes communicate by transmitting signals and/or messages through an intermediary device, such as another NUMA node. For example, node 103 may communicate indirectly with node 104 via another intermediary node (not shown). NUMA nodes that directly connect do not relay communication through intermediary devices, such as node 103 directly connected to node 104.

The benefits and efficiencies of NUMA systems may also be realized in virtualization systems. As such, virtual machine 170 may also be implemented as a NUMA system having multiple NUMA nodes, which may be referred to as virtual NUMA nodes. As shown in FIG. 1, virtual machine 170 may include virtual NUMA nodes 180 and 190. Virtual NUMA nodes 180, 190 may correspond to a particular set of virtual CPUs (vCPUs) of VM 170 that have identical access latency to a local subset of memory of VM 170. As such, each virtual NUMA node 180, 190 may include guest processors (e.g., vCPUs) and guest memory. In the example as shown in FIG. 1, virtual NUMA node 180 can include guest memory 185 and vCPU 186, vCPU 187, vCPU 188, and/or vCPU 189. Virtual NUMA node 190 can include guest memory 195 and vCPU 196, vCPU 197, vCPU 198, and/or vCPU 199. vCPUs communicatively coupled to memory devices within a virtual node may perform local memory access. For example, vCPU 186 may locally access memory 185 on virtual NUMA node 180 and non-locally access memory 195 on virtual NUMA node 190. Although two virtual NUMA nodes are shown for example purposes in FIG. 1, a NUMA system, such as VM 170, may include more than two virtual NUMA nodes.

In one implementation, hypervisor 150 may maintain a mapping of virtual NUMA nodes 180, 190 to host NUMA nodes 103, 104. For example, the mapping maintained by hypervisor 150 may indicate that virtual NUMA node 180 maps to host NUMA node 103 of host computer system 100 and virtual NUMA node 190 maps to host NUMA node 104 of host computer system 100. In one implementation, the mapping may be maintained in a dedicated data store of the hypervisor 150, such as a table (not shown).

As previously discussed, conflicts and inefficiencies can occur when both the host computer system 100 and the VM 170 each manage balancing of NUMA systems independently. Although the NUMA systems of each component may be established separately, they both rely on the same physical address space to store the underlying data utilizing the NUMA systems. Implementations of the disclosure provide a solution for enabling the VM 170 and the host machine 100 to each perform automatic NUMA balancing without conflicting with one another.

In one implementation, hypervisor 150 and VM 170 each include a NUMA agent, host NUMA agent 152 and guest NUMA agent 177, to perform implementations of the disclosure described herein. In addition, VM 170 includes guest page tables 179 to map guest virtual addresses (GVAs) to guest physical addresses (GPAs) of the guest memory 185, 195. Guest memory 185, 195 corresponds to allocated portion of host computer system memory 130, 140. As such, the hypervisor 150 include host page tables 154 to map the GPAs of VM 170 to host physical addresses (HPAs) of memory 130, 140. This is sometimes referred to as two-stage memory translation.

In one implementation, memory 185, 195 that is allocated to the VM 170 can be mapped in the guest physical address space at multiple addresses. Each GPA is identified by a tag. This tag may be referred to herein as a host address space identifier (HASID). Each HASID conceptually maps the corresponding guest physical address to a virtual NUMA node for the VM 170. For example, an HASID could map to a group of vCPUs of a virtual NUMA node 180, 190 of VM 170.

As part of an automatic NUMA balancing process, a VM 170 may determine to move a guest memory page from one virtual NUMA node to another virtual NUMA node on the VM 170. Instead of performing a copy of the memory page, as was done in conventional systems, the guest NUMA agent 177 can update the GPA of the memory page in a corresponding entry of the guest page tables 179. As part of updating the entry in the guest page tables 179. The guest NUMA agent 177 calculates a new GPA that incorporates the HASID corresponding to the new destination virtual NUMA node.

For example, the HASID can be encoded in high (upper) bits of the GPA. In one implementation, the top eight upper or high bits in the GPA may be used to encode the HASID to be associated with the memory page.

In another example, the HASID may be a value (such as an offset, etc.) that is applied to the memory address of the memory page to cause the GPA to fall in a range outside of the addressable memory addresses of the VM 170. However, the range in which the address falls may be mapped to a particular virtual NUMA node of the VM 170. A lookup table may be utilized to identify the memory address and virtual NUMA node associated with the GPA as modified by the HASID.

In one implementation, the mapping of HASIDs to virtual NUMA nodes (e.g., groups of vCPUs) is agreed upon by both the host computer system 100 (e.g. hypervisor 150) and the VM 170. For example, the mapping can be sent by the VM 170 to the host computer system 100 (e.g., hypervisor 170) or vice versa. When the mapping changes, the change can be synchronized between the VM 170 and the host computer system 100. In some implementations, the mapping is determined as part of the default programming (hard-coding) of the hypervisor 150 and VM 170 and, as such, a dynamic handshake agreement protocol is not used.

After the guest NUMA agent 177 updates to the entry in the guest page tables 179 with the GPA reflecting the new HASID, a data access by the VM 170 to the old GPA for the memory page triggers a page fault and exit to an the hypervisor 150.

The hypervisor 150 can then decode the HASID from the GPA. In one implementation, the host NUMA agent 152 decodes the HASID from the GPA according to the determined format that the HASID modifies the GPA. For example, if the HASID is included in the upper bits of the GPA, the host NUMA agent 152 extracts the upper bits from the GPA to identify the HASID. If a function is to be applied to the GPA, then the GPA is used to reference a look up table to determine how to identify the memory address and HASID implied by the particular GPA.

Once the HASID is identified, the host NUMA agent 152 can make a determination on whether to migrate the memory page close to the accessing vCPU (or the vCPU close to the memory page) or to take no action in this regard. The host NUMA agent 152 can utilize the HASID to determine the host NUMA node 103, 104 to migrate the memory page. Various factors may influence the host NUMA agent's 152 decision on whether to migrate, the memory page, such as: automatic NUMA balancing criteria, current memory and processor utilization, predicted resource usage, and so on.

If the host NUMA agent 152 decides to migrate the page, the host NUMA agent 152 can copy the data of the memory page from a current NUMA node 103, 104 to a new NUMA node 103, 104. The host NUMA agent 152 can use the HASID decoded from the GPA to inform the selection of the new NUMA node 103, 104 to migrate the memory page. In this way, the HASID operates as a hint from the VM 170 to the hypervisor as to the virtual node 180, 190 preferred by the VM 170. The host NUMA agent 152 is aware of the mapping of virtual NUMA nodes 180, 190 to host NUMA nodes 103, 104 (e.g., a mapping and/or table may maintain this information and be accessible by the host NUMA agent 152).

As part of the copy (i.e., migrate) process of the memory page, the host NUMA agent 152 identifies an existing entry in host page tables 154 that corresponds to the source location (memory address) of the memory page prior to copying/migration. The host NUMA agent 152 destroys (e.g., deletes, removes, invalidates, etc.) this existing entry in the host page tables 154. Once the copy/migration process is complete, the host NUMA agent 152 creates a new entry for the GPA in the host page tables 154 pointing at the new address.

If the host NUMA agent 152 decides not to migrate the memory page, the host NUMA agent 152 creates a new entry in the host page tables 154 for the new GPA. This new entry (for the new GPA) remains pointing to the same host physical address (old location) on the host computing system 100. In one implementation, creating the new entry includes destroying the existing entry in the host page tables 154 and creating the new entry in the host page tables 154.

Furthermore, if the host NUMA agent 152 decides not to migrate the memory page, the host NUMA agent 152 can instead choose to migrate the vCPU 186-189, 196-199 (faulting vCPU) closer to the memory page. For example, the host NUMA agent 152 can utilize the HASID to locate the host NUMA node 103, 104. Using the host NUMA node 103, 104 information, the host NUMA agent 152 can identify a host CPU 131-134, 141-144 corresponding to the host NUMA node 103, 104 and can cause the faulting vCPU 186-189, 196-199 to run on this host CPU 131-134, 141-144.

In both cases (migration and no migration), the new entry in the host page tables 154 is pointing at the host page address for the GPA that includes the new HASID. Therefore, any subsequent accesses by the VM 170 can proceed without a page fault and, thus, without an exit to hypervisor 150.

Figure 2:
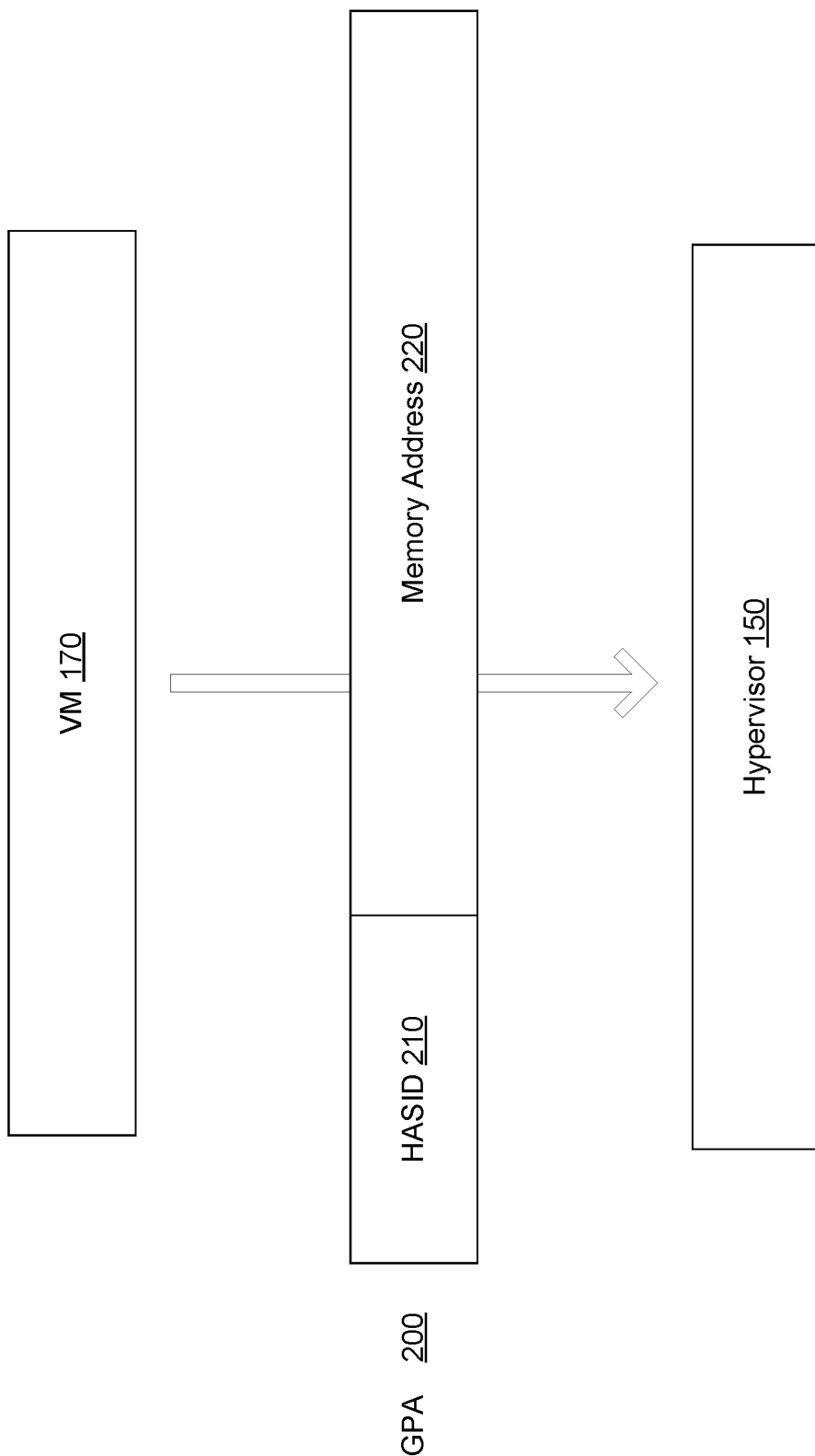
FIG. 2 depicts a schematic diagram illustrating an example of a GPA used to provide host address space identifiers (HASIDs) for non-uniform memory access (NUMA) locality in virtual machines (VMs), in accordance with some implementations of the disclosure.

FIG. 2 depicts a schematic diagram illustrating an example of a GPA 200 used to provide HASIDs for NUMA locality in VMs, in accordance with some implementations of the disclosure. In some implementations, GPA 200 may be provided by VM 170 to hypervisor 150 as described with respect to FIG. 1. As shown in FIG. 2, GPA 200 includes an HASID portion 210 and a memory address portions 220.

HASID 210 may be provided in the upper bits (E.g., top 8 bits, etc.) of GPA 200 while memory address 220 is provide in the lower bits of GPA 200. HASID 210 may be decoded from GPA 200 by hypervisor 150 and used as a hint in performing automatic NUMA balancing by the hypervisor 150. As discussed above with respect to FIG. 1, other approaches to incorporating HASIDs into a GPA (e.g., offset, function, etc.) may also be utilized in implementations of the disclosure.

Figure 3:
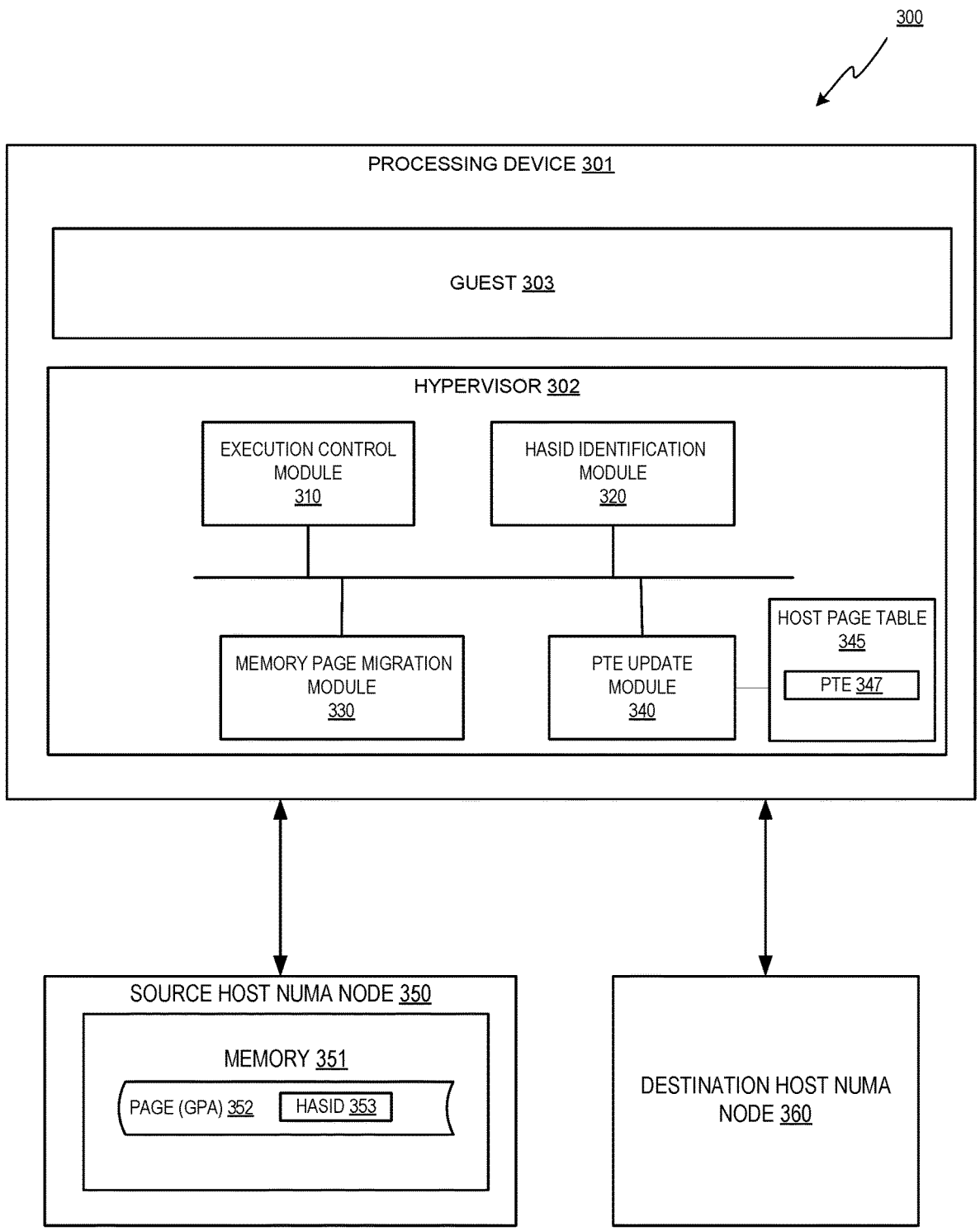
FIG. 3 depicts a block diagram of a computer system operating in accordance with one or more aspects of the disclosure.

FIG. 3 depicts a block diagram of a computer system 300 operating in accordance with one or more aspects of the disclosure. Computer system 300 may be the same or similar to host computer system 100 and may include one or more processing devices 301 and one or more memory devices 351. In the example shown, computer system 300 may include components and modules for HASIDs for NUMA locality in VMs.

The computer system 300 may include a memory 352 that can store one or more memory pages 352. In one implementation, the memory pages 352 can be memory (e.g., a page cache) of the computer system 300 virtualized for use by guest 303. The memory 352 may be and/or include a volatile or non-volatile memory device, such as RAM (random-access memory), ROM (read-only memory), EEPROM (electrically erasable programmable read-only memory), or any other device capable of storing data.

The computer system 300 may include a processing device 301 with a hypervisor 302 that manages a guest 303 (also referred to herein as a VM) executed by the processing device 301. The hypervisor 303 may implement HASIDs for NUMA locality in VMs during automatic NUMA balancing of host NUMA nodes (e.g., source host NUMA node 305, destination host NUMA node 360) of the computer system 300 or virtual NUMA nodes (not shown) of the guest 303.

The hypervisor 302 may include an execution control module 310, a HASID identification module 320, a memory page migration module 330, and a page table entry (PTE) update module 340. Hypervisor 302 may further include a host page table 345 having one or more PTEs 347. Host page table 345 may include page table entries (e.g., PTE 347) defining mappings of GPAs of the guest 303 to host physical addresses (HPAs) of the computer system 300.

The execution control module 310 may receive execution control from the guest 303 managed by a hypervisor 302. In one implementation, a page fault corresponding to a GPA 352 of the guest 303 triggered an exit to the hypervisor 302 from the guest 303. The HASID identification module 320 may identify an HASID 353 from the GPA 352.

The memory page migration module 330 may determine, in view of the HASID 353, whether to migrate a memory page 352 associated with the GPA to a destination host NUMA node 360 corresponding to the HASID. The memory page 352 is currently residing in memory 351 corresponding to a source host NUMA node 350. The PTE update module 340 may create a new PTE 347 for the GPA in a host page table 345 of the hypervisor 302.

Figure 4:
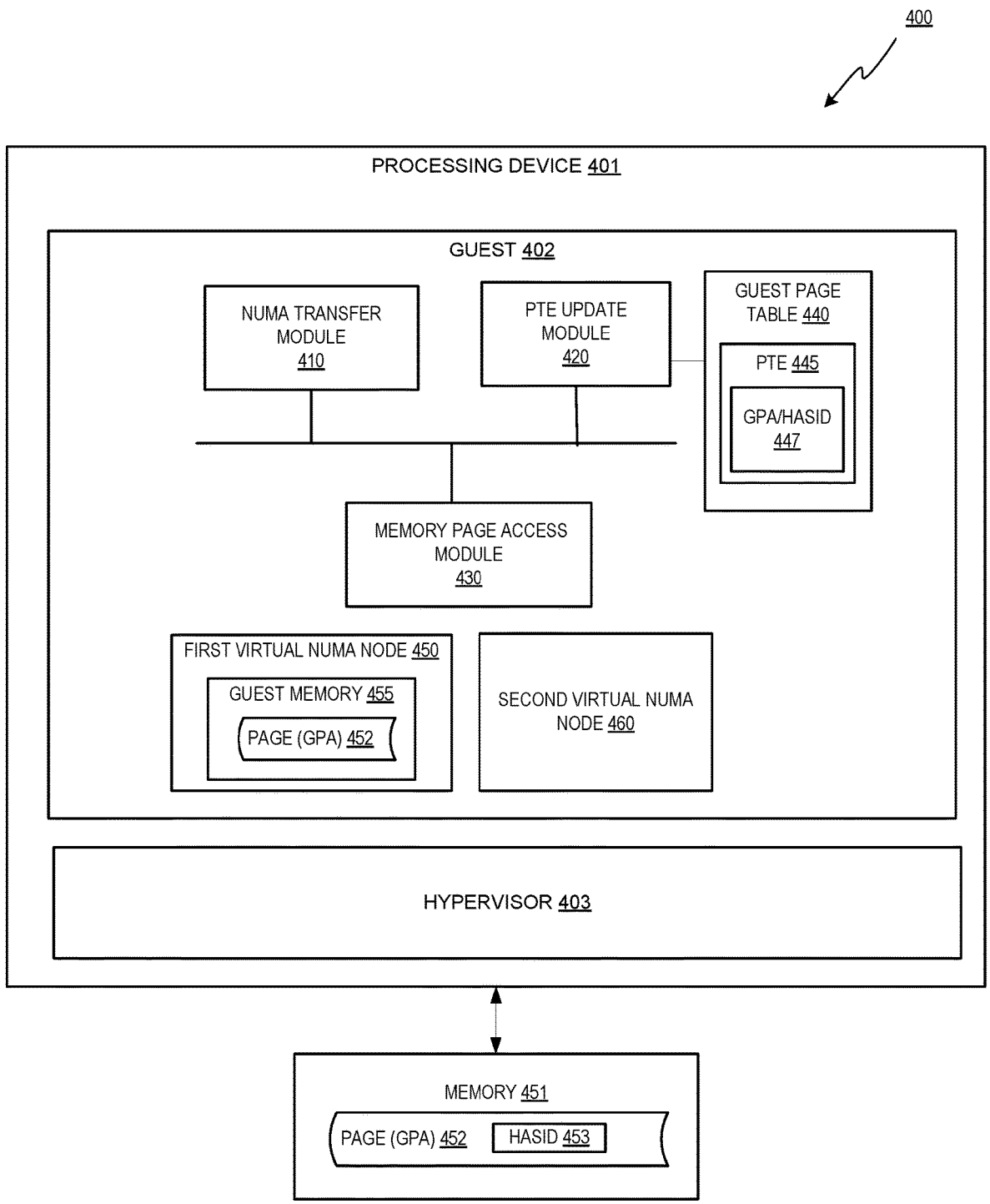
FIG. 4 a block diagram of a computer system operating in accordance with one or more aspects of the disclosure.

FIG. 4 depicts a block diagram of a computer system 400 operating in accordance with one or more aspects of the disclosure. Computer system 400 may be the same or similar to host computer system 100 and may include one or more processing devices 401 and one or more memory devices 451. In the example shown, computer system 400 may include components and modules for HASIDs for NUMA locality in VMs.

The computer system 400 may include a memory 451 that can store one or more memory pages 452. In one implementation, the memory pages 452 can be part of guest memory 455 that corresponds to portion(s) of the memory 451 of the computer system 400 virtualized for use by a guest 402. The memory 451 may be and/or include a volatile or non-volatile memory device, such as RAM (random-access memory), ROM (read-only memory), EEPROM (electrically erasable programmable read-only memory), or any other device capable of storing data.

The computer system 400 may include a processing device 401 with a hypervisor 403 that manages a guest 402 (also referred to herein as a VM) executed by the processing device 401. The guest 402 may implement HASIDs for NUMA locality in VMs during automatic NUMA balancing of host NUMA nodes (not shown) of the computer system 400 or virtual NUMA nodes (e.g., first virtual NUMA node 450, second virtual NUMA node 460) of the guest 402. PTE update module 420, and memory page access module 430. Guest 402 may further include a guest page table 440 having one or more PTEs 445. The PTEs 445 of guest page table 440 may define mappings of guest virtual addresses (GVAs) of the guest 402 to GPAs 447 of the guest 402.

The NUMA transfer module 310 may determine that a memory page 452 of the guest 402 should be moved from a first virtual NUMA node 450 of the guest 402 to a second virtual NUMA node 460 of the guest 402. The PTE update module 420 may update, in the guest page table 440, a GPA 447 of the memory page 452 to include a HASID 447 of the second virtual NUMA node 460.

The memory page access module 430 may attempt to access the updated GPA 447, 452. The processing device 401 may cause an exit from the guest 402 to the hypervisor 403 in response to a page fault resulting from attempting to access the updated GPA 447, 452.

FIG. 5 is a flow diagram illustrating a method 500 for HASIDs for NUMA locality in VMs as applied by a hypervisor, according to an implementation of the disclosure. Method 500 can be performed by processing logic that may comprise hardware (e.g., circuitry, dedicated logic, programmable logic, microcode, etc.), software (such as instructions run on a processing device), firmware, or a combination thereof. In one implementation, method 500 is performed by a processing device (e.g. a processing device 1102 of FIG. 11) of a host computer system as described in connection with FIG. 1. In some implementations, method 500 can be performed by hypervisor 150 running on the host computer system 100 described with respect to FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media.

Referring to FIG. 5, method 500 begins at block 510 where the processing device performs one or more operations to receive execution control from a guest managed by a hypervisor. In one implementation, a page fault corresponding to a guest physical address (GPA) triggered an exit to the hypervisor from the guest. At block 520, the processing device identifies a host address space identifier (HASID) from the GPA.

Subsequently, at block 530, the processing device determines, in view of the HASID, whether to migrate a memory page associated with the GPA to a destination host non-uniform memory access (NUMA) node corresponding to the HASID. Lastly, at block 540, the processing device creates a new page table entry for the GPA in a host page table of the hypervisor.

Figure 6:
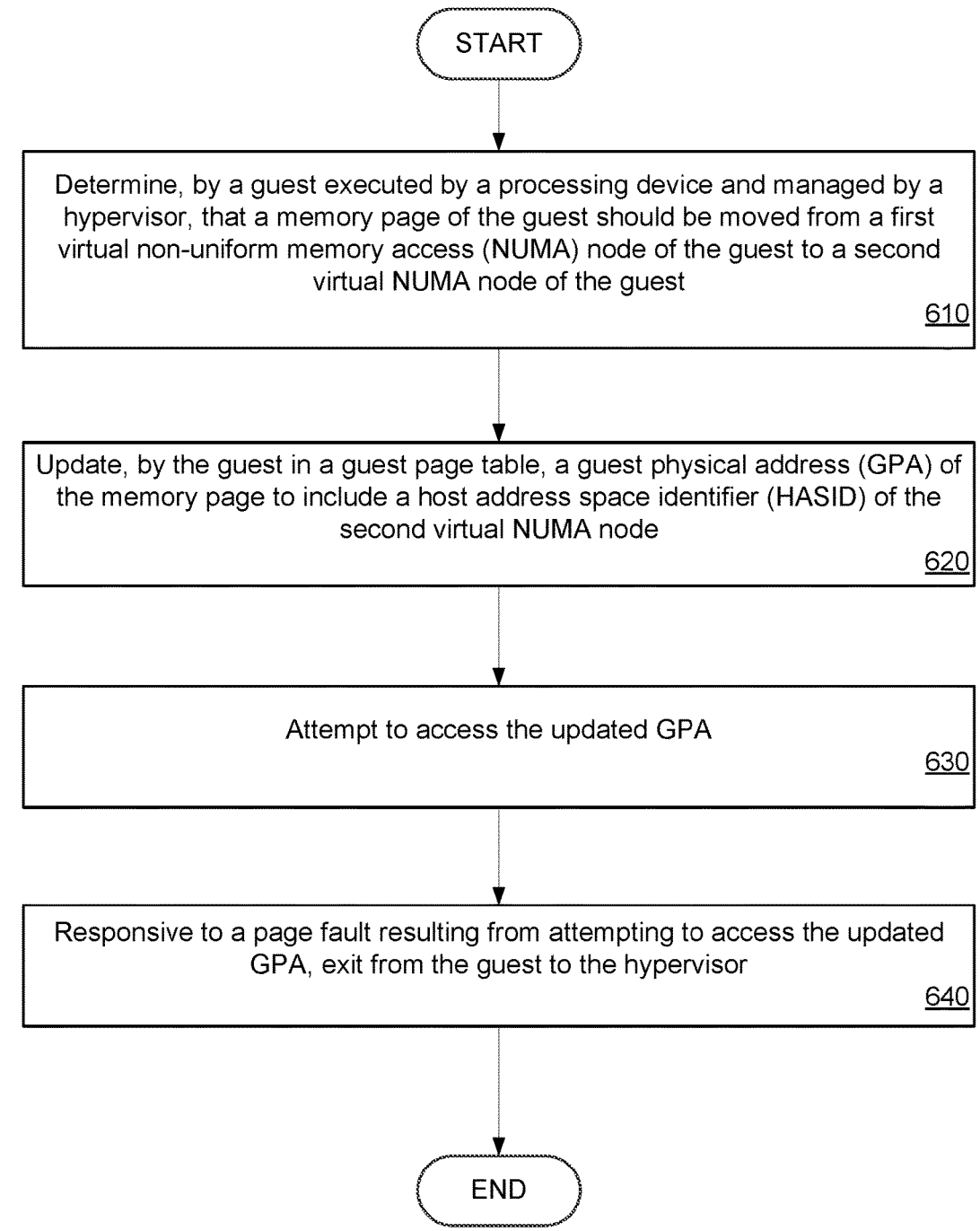
FIG. 6 is a flow diagram illustrating a method for HASIDs for NUMA locality in VMs as applied by a guest, according to an implementation of the disclosure.

FIG. 6 is a flow diagram illustrating a method 600 for HASIDs for NUMA locality in VMs as applied by a guest, according to an implementation of the disclosure. Method 600 can be performed by processing logic that may comprise hardware (e.g., circuitry, dedicated logic, programmable logic, microcode, etc.), software (such as instructions run on a processing device), firmware, or a combination thereof. In one implementation, method 600 is performed by a processing device (e.g. a processing device 1102 of FIG. 11) of a source computer system as described in connection with FIG. 1. In some implementations, method 600 can be performed by VM (guest) 170 running on the host computer system 100 described with respect to FIG. 1.

Referring to FIG. 6, method 600 begins at block 610 where the processing device performs one or more operations to determine that a memory page of the guest should be moved from a first virtual NUMA node of the guest to a second virtual NUMA node of the guest. Then, at block 620, the processing device updates, via the guest in a guest page table, a guest physical address (GPA) of the memory page to include a host address space identifier (HASID) of the second virtual NUMA node.

Subsequently, at block 630, the processing device attempts to access the updated GPA. Lastly, at block 640, the processing device causes an exit from the guest to the hypervisor in response to a page fault resulting from attempting to access the updated GPA.

FIG. 7 is a flow diagram illustrating a method 700 for HASIDs using upper bits for NUMA locality in VMs as applied by a hypervisor, according to an implementation of the disclosure. Method 700 can be performed by processing logic that may comprise hardware (e.g., circuitry, dedicated logic, programmable logic, microcode, etc.), software (such as instructions run on a processing device), firmware, or a combination thereof. In one implementation, method 700 is performed by a processing device (e.g. a processing device 1102 of FIG. 11) of a source computer system as described in connection with FIG. 1. In some implementations, method 700 can be performed by hypervisor 150 running on the host computer system 100 described with respect to FIG. 1.

Method 700 can begin at block 710 where the hypervisor receives execution control from a virtual machine (VM), where a page fault corresponding to a GPA triggered an exit to the hypervisor from the VM. At block 720, the hypervisor decodes the GPA to identify a HASID located in upper bits of the GPA.

Subsequently, at block 730, the hypervisor determines, in view of the HASID, whether to migrate a memory page associated with the GPA. Lastly, at block 740, the hypervisor creates a new page table entry for the GPA in a host page table of the hypervisor.

Figure 8:
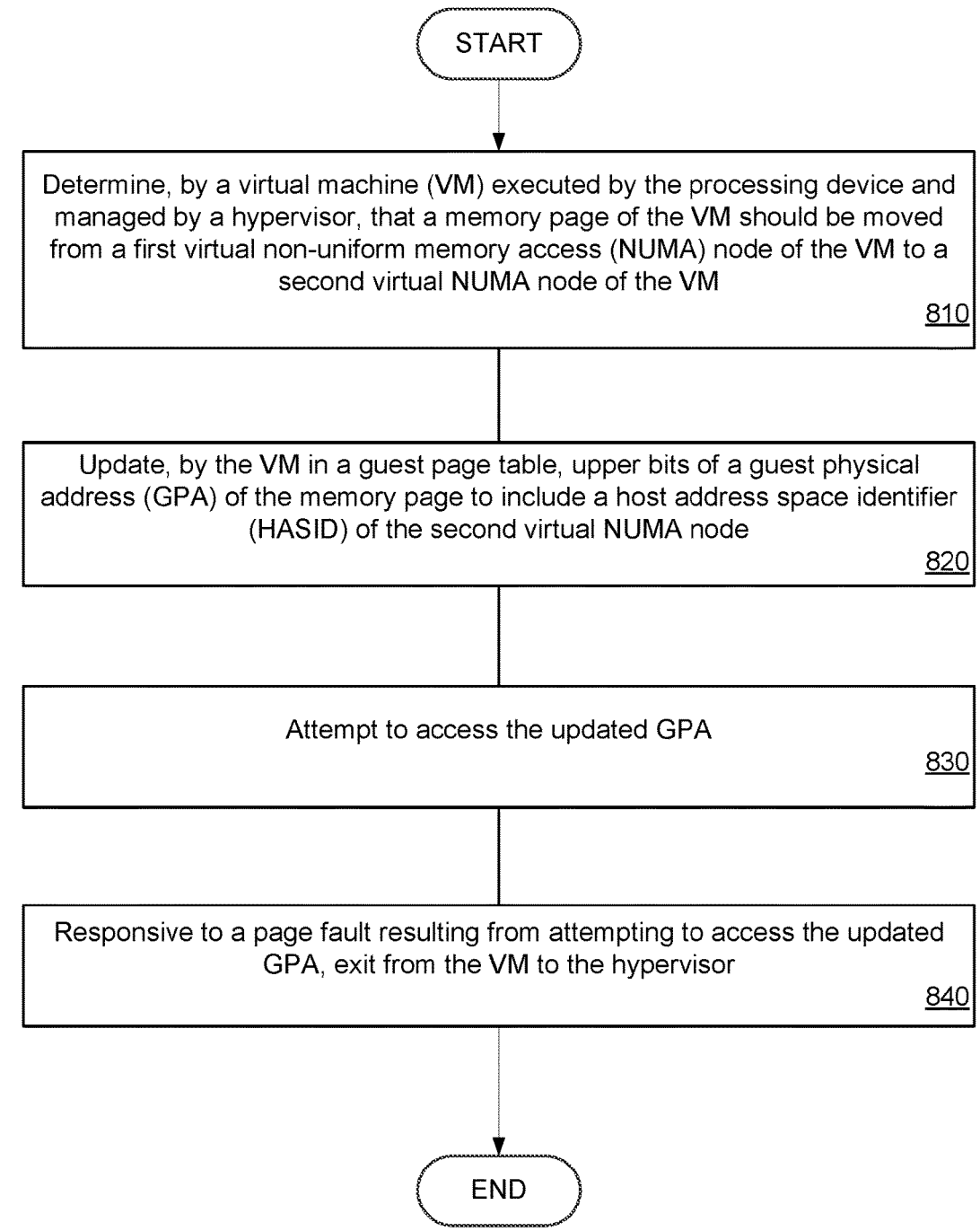
FIG. 8 is a flow diagram illustrating a method for HASIDs using upper bits for NUMA locality in VMs as applied by a VM, according to an implementation of the disclosure.

FIG. 8 is a flow diagram illustrating a method 800 for HASIDs using upper bits for NUMA locality in VMs as applied by a VM, according to an implementation of the disclosure. Method 800 can be performed by processing logic that may comprise hardware (e.g., circuitry, dedicated logic, programmable logic, microcode, etc.), software (such as instructions run on a processing device), firmware, or a combination thereof In some implementations, method 800 can be performed by VM 170 running on the host computer system 100 described with respect to FIG. 1.

Method 800 begins at block 810 where the processing device performs one or more operations to determine that a memory page of the VM should be moved from a first virtual NUMA node of the VM to a second virtual NUMA node of the VM. Then, at block 820, the processing device updates, via the VM in a guest page table, upper bits of a guest physical address (GPA) of the memory page to include a host address space identifier (HASID) of the second virtual NUMA node.

Subsequently, at block 830, the processing device attempts to access the updated GPA. Lastly, at block 840, the processing device causes an exit from the VM to the hypervisor in response to a page fault resulting from attempting to access the updated GPA.

Figure 9:
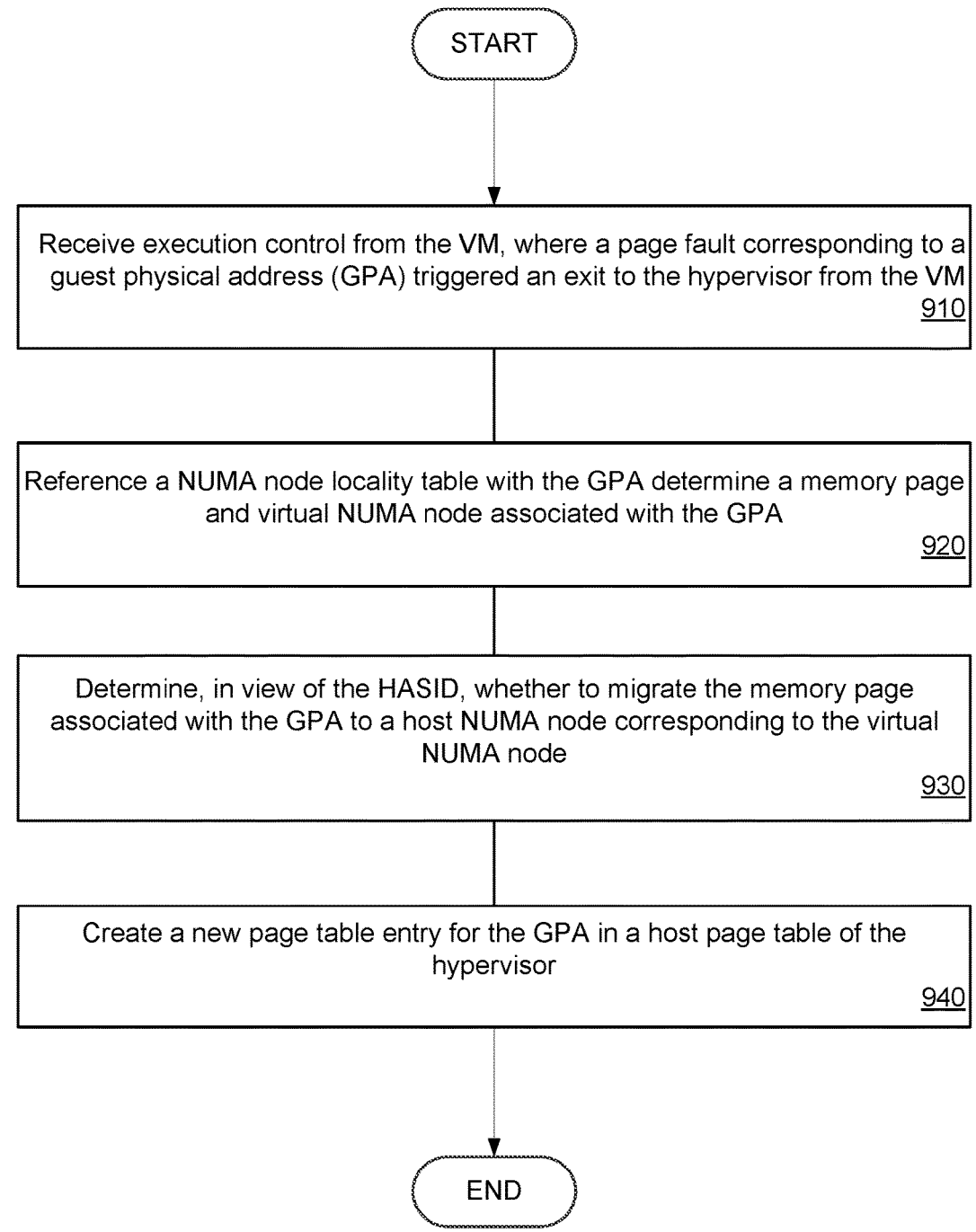
FIG. 9 is a flow diagram illustrating a method for HASIDs using address range lookup for NUMA locality in VMs as applied by a hypervisor, according to an implementation of the disclosure.

FIG. 9 is a flow diagram illustrating a method 900 for HASIDs using address range lookup for NUMA locality in VMs as applied by a hypervisor, according to an implementation of the disclosure. Method 900 can be performed by processing logic that may comprise hardware (e.g., circuitry, dedicated logic, programmable logic, microcode, etc.), software (such as instructions run on a processing device), firmware, or a combination thereof. In some implementations, method 900 can be performed by hypervisor 150 running on the host computer system 100 described with respect to FIG. 1.

Method 900 begins at block 910 where the processing device receives execution control from the VM. In one implementation, a page fault corresponding to a guest physical address (GPA) triggered an exit to the hypervisor from the VM.

Subsequently, at block 920, the processing device references a NUMA node locality table with the GPA determine a memory page and virtual NUMA node associated with the GPA. Then, at block 930, the processing device determines, in view of the HASID, whether to migrate the memory page associated with the GPA to a host NUMA node corresponding to the virtual NUMA node. Lastly, at block 940, the processing device creates a new page table entry for the GPA in a host page table of the hypervisor.

FIG. 10 is a flow diagram illustrating a method 1000 for HASIDs using address range lookup for NUMA locality in VMs as applied by a VM, according to an implementation of the disclosure. Method 1000 can be performed by processing logic that may comprise hardware (e.g., circuitry, dedicated logic, programmable logic, microcode, etc.), software (such as instructions run on a processing device), firmware, or a combination thereof. In some implementations, method 1000 can be performed by VM 170 running on the host computer system 100 described with respect to FIG. 1.

Method 1000 begins at block 1010 where the processing device determines that a memory page of the VM should be moved from a first virtual NUMA node of the VM to a second virtual NUMA node of the VM. Then, at block 1020, the processing device references a NUMA node locality table to identify an offset associated with a host address space identifier (HASID) corresponding to the second virtual NUMA node with the second virtual NUMA node.

Subsequently, at block 1030, the processing device adjusts an address of the memory page by the offset. At block 1040, the processing device stores the adjusted address as a guest physical address (GPA) for the memory page in a guest page table of the VM.

Then, at block 1050, the processing device attempts to access the GPA for the memory page. Lastly, at block 1060, the processing device causes an exit from the guest to the hypervisor in response to a page fault resulting from attempting to access the GPA.

Figure 11:
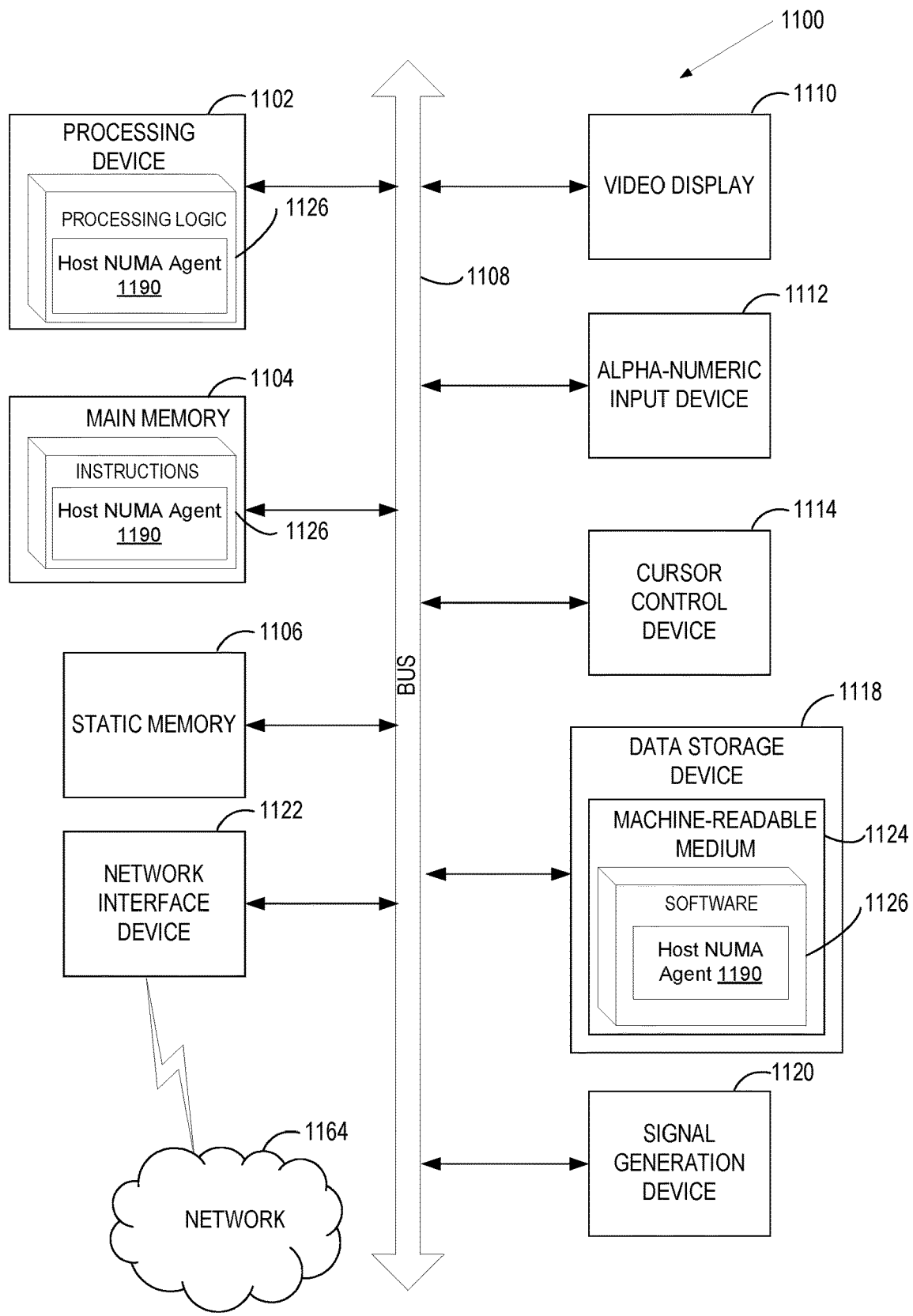
FIG. 11 illustrates a block diagram of one implementation of a computer system.

FIG. 11 illustrates a diagrammatic representation of a machine in the example form of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102 (e.g., processor, CPU, etc.), a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1108.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute the processing logic 1126 for performing the operations and steps discussed herein.

The computer system 1100 may further include a network interface device 1122 communicably coupled to a network 1164. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1118 may include a machine-accessible storage medium 1124 on which is stored software 1126 embodying any one or more of the methodologies or functions described herein. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 to implement a host NUMA agent 1190 and/or a software library containing methods that call the above applications. Host NUMA agent 1190 can implement HASIDs for NUMA locality in VMs by performing one or more operations described in connection with FIGS. 1-10 above. While the machine-accessible storage medium 1124 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Other computer system designs and configurations may also be suitable to implement the system and methods described herein. The following examples illustrate various implementations in accordance with one or more aspects of the disclosure.

The following examples pertain to further embodiments. Example 1 is a method for HASIDs for NUMA locality in VMs comprising receiving, by a hypervisor executed by a processing device of a host machine, execution control from a guest managed by the hypervisor, wherein a page fault corresponding to a guest physical address (GPA) triggered an exit to the hypervisor from the guest an identifying a host address space identifier (HASID) from the GPA. Further to Example 1, the method additional comprises determining, in view of the HASID, whether to migrate a memory page associated with the GPA to a destination host non-uniform memory access (NUMA) node corresponding to the HASID, and creating a new page table entry for the GPA in a host page table of the hypervisor.

In Example 2, the subject matter of Example 1 can optionally include wherein the HASID is maintained in a determined number of upper bits of the GPA, wherein an address portion of the GPA is maintained in lower bits of the GPA separate from the HASID. In Example 3, the subject matter of any one of Examples 1-2 can optionally include wherein identifying the HASID comprises referencing a NUMA node locality table maintained by the hypervisor with the GPA, and identifying a host physical address and the HASID corresponding to the GPA in the NUMA node locality table.

In Example 4, the subject matter of any one of Examples 1-3 can optionally include wherein the HASID corresponds to an offset used to adjust the GPA. In Example 5, the subject matter of any one of Examples 1-4 can optionally include wherein the adjusting the GPA with the offset causes the GPA to reside outside of a range of memory addresses that the guest accesses. In Example 6, the subject matter of any one of Examples 1-5 can optionally include further comprising, responsive to determining to migrate the memory page, determining the destination host NUMA node corresponding to the virtual NUMA of the HASID, and copying data of the memory page from a first location of the memory page in a source host NUMA node to a second location of the memory in at the destination host NUMA node.

In Example 7, the subject matter of any one of Examples 1-6 can optionally include wherein the HASID comprises a virtual NUMA node indicated by the guest to associate with the GPA, the virtual NUMA node different than a current virtual NUMA node associated with the GPA. In Example 8, the subject matter of any one of Examples 1-7 can optionally include wherein mapping of HASIDs to groups of virtual central processing units (vCPUs) of the guest is agreed upon by both the host machine and the guest.

In Example 9, the subject matter of any one of Examples 1-8 can optionally include wherein a change to the mapping of the HASIDs to the groups of vCPUs is synchronized between the host machine and the guest. In Example 10, the subject matter of any one of Examples 1-9 can optionally include further comprising, responsive to determining not to migrate the memory page associated with the GPA to the destination host NUMA node corresponding to the HASID, identifying the destination host NUMA node corresponding to the HASID, selecting a host central processing unit (CPU) of the destination host NUMA node, and causing a virtual CPU that generated the page fault to run on the selected host CPU.

Example 11 is another method for HASIDs for NUMA locality in VMs comprising determining, by a guest executed by a processing device and managed by a hypervisor, that a memory page of the guest should be moved from a first virtual non-uniform memory access (NUMA) node of the guest to a second virtual NUMA node of the guest, and updating, by the guest in a guest page table, a guest physical address (GPA) of the memory page to include a host address space identifier (HASID) of the second virtual NUMA node. Further to Example 11, the method additionally comprises attempting to access the updated GPA, and responsive to a page fault resulting from attempting to access the updated GPA, exiting from the guest to the hypervisor.

In Example 12, the subject matter of Example 11 can optionally include wherein the HASID is maintained in a determined number of upper bits of the GPA, wherein an address portion of the GPA is maintained in lower bits of the GPA separate from the HASID. In Example 13, the subject matter of any one of Examples 11-12 can optionally include wherein updating the GPA comprises referencing a guest NUMA node locality table to determine an offset to add to an address of memory page, the offset corresponding to the second virtual NUMA node, and generating the GPA in view of the offset.

In Example 14, the subject matter of any one of Examples 11-13 can optionally include wherein the HASID corresponds to an offset used to adjust the GPA, and wherein the adjusting the GPA with the offset causes the GPA to reside outside of a range of memory addresses that the guest accesses. In Example 15, the subject matter of any one of Examples 11-14 can optionally include wherein the HASID comprises a virtual NUMA node indicated by the guest to associate with the GPA, the virtual NUMA node different than a current virtual NUMA node associated with the GPA.

In Example 16, the subject matter of any one of Examples 11-15 can optionally include wherein mapping of HASIDs to groups of virtual central processing units (vCPUs) of the guest is agreed upon by both the host machine and the guest. In Example 17, the subject matter of any one of Examples 11-16 can optionally include wherein a change to the mapping of the HASIDs to the groups of vCPUs is synchronized between the host machine and the guest.

Example 18 is an apparatus for implementing HASIDs for NUMA locality in VMs. In Example 18, the apparatus includes a memory and a processing device communicably coupled to the memory, where the processing device is to determine, by a guest executed by a processing device and managed by a hypervisor, that a memory page of the guest should be moved from a first virtual non-uniform memory access (NUMA) node of the guest to a second virtual NUMA node of the guest and update, by the guest in a guest page table, a guest physical address (GPA) of the memory page to include a host address space identifier (HASID) of the second virtual NUMA node. Further to Example 18, the processing device is further to attempt to access the updated GPA, and responsive to a page fault resulting from attempting to access the updated GPA, exit from the guest to the hypervisor.

In Example 19, the subject matter of Example 18 can optionally include wherein the HASID is maintained in a determined number of upper bits of the GPA, wherein an address portion of the GPA is maintained in lower bits of the GPA separate from the HASID. In Example 20, the subject matter of Examples 18-19 can optionally include wherein updating the GPA comprises referencing a guest NUMA node locality table to determine an offset to add to an address of memory page, the offset corresponding to the second virtual NUMA node, and generating the GPA in view of the offset.

In Example 21, the subject matter of Examples 18-20 can optionally include wherein the HASID comprises a virtual NUMA node indicated by the guest to associate with the GPA, the virtual NUMA node different than a current virtual NUMA node associated with the GPA. In Example 22, the subject matter of Examples 18-21 can optionally include wherein mapping of HASIDs to groups of virtual central processing units (vCPUs) of the guest is agreed upon by both the host machine and the guest.

Example 23 is another apparatus for implementing HASIDs for NUMA locality in VMs. In Example 23, the apparatus includes a processing device to execute a hypervisor to manage at least one virtual machine (VM), where the processing device is to receive, by the hypervisor, execution control from the VM, wherein a page fault corresponding to a guest physical address (GPA) triggered an exit to the hypervisor from the VM, and decode, by the hypervisor, the GPA to identify a host address space identifier (HASID) located in upper bits of the GPA. Further to Example 23, the processing device is additionally to determine, by the hypervisor in view of the HASID, whether to migrate a memory page associated with the GPA, and create, by the hypervisor, a new page table entry for the GPA in a host page table of the hypervisor.

In Example 24, the subject matter of Example 23 can optionally include wherein an address portion of the GPA is maintained in lower bits of the GPA separate from the HASID. In Example 25, the subject matter of Examples 23-24 can optionally include wherein the processing device is further to, responsive to determining to migrate the memory page, determine a destination host NUMA node corresponding to the virtual NUMA of the HASID, and copy data of the memory page from a first location of the memory page in a source host NUMA node to a second location of the memory in at the destination host NUMA node.

In Example 26, the subject matter of Examples 23-25 can optionally include wherein the processing device is further to, prior to creating the new page table entry in the host page table, identify a previous mapping of a memory address of the GPA to another host NUMA node, and remove the previous mapping in the host page table. In Example 27, the subject matter of Examples 23-26 can optionally include wherein the HASID comprises a virtual NUMA node indicated by the guest to associate with the GPA, the virtual NUMA node different than a current virtual NUMA node associated with the GPA.

In Example 28, the subject matter of Examples 23-27 can optionally include wherein a mapping of HASIDs to groups of virtual central processing units (vCPUs) of the guest is agreed upon by both the host machine and the guest. In Example 29, the subject matter of Examples 23-28 can optionally include wherein a change to the mapping of the HASIDs to the groups of vCPUs is synchronized between the host machine and the guest.

Example 30 is a non-transitory computer-readable medium for implementing HASIDs for NUMA locality in VMs. In Example 30, the non-transitory machine-readable medium includes instructions that, when executed by a processing device, cause the processing device to receive, at a hypervisor executed by the processing device, execution control from a virtual machine (VM) managed by the hypervisor, wherein a page fault corresponding to a guest physical address (GPA) triggered an exit to the hypervisor from the VM, decode, by the hypervisor, the GPA to identify a host address space identifier (HASID) located in upper bits of the GPA, determine, by the hypervisor in view of the HASID, whether to migrate a memory page associated with the GPA, and create, by the hypervisor, a new page table entry for the GPA in a host page table of the hypervisor.

In Example 31, the subject matter of Example 30 can optionally include wherein an address portion of the GPA is maintained in lower bits of the GPA separate from the HASID. In Example 32, the subject matter of Examples 30-31 can optionally include memory page, determine a destination host NUMA node corresponding to the virtual NUMA of the HASID, and copy data of the memory page from a first location of the memory page in a source host NUMA node to a second location of the memory in at the destination host NUMA node.

In Example 33, the subject matter of Examples 30-32 can optionally include wherein the processing device is further to, prior to creating the new page table entry in the host page table, identify a previous mapping of a memory address of the GPA to another host NUMA node, and remove the previous mapping in the host page table. In Example 34, the subject matter of Examples 30-33 can optionally include wherein the HASID comprises a virtual NUMA node indicated by the guest to associate with the GPA, the virtual NUMA node different than a current virtual NUMA node associated with the GPA.

Example 35 is a system for implementing HASIDs for NUMA locality in VMs. In Example 35, the system includes a memory and a processing device coupled to the memory, where the processing device is to determine, by a virtual machine (VM) executed by the processing device and managed by a hypervisor, that a memory page of the VM should be moved from a first virtual non-uniform memory access (NUMA) node of the VM to a second virtual NUMA node of the VM, and update, by the VM in a guest page table, upper bits of a guest physical address (GPA) of the memory page to include a host address space identifier (HASID) of the second virtual NUMA node. In Example 35, the processing device is additionally to attempt to access the updated GPA, and responsive to a page fault resulting from attempting to access the updated GPA, exit from the VM to the hypervisor.

In Example 36, the subject matter of Example 35 can optionally include wherein the HASID comprises a virtual NUMA node indicated by the VM to associate with the GPA, the virtual NUMA node different than a current virtual NUMA node associated with the GPA. In Example 37, the subject matter of Examples 35-36 can optionally include wherein mapping of HASIDs to groups of virtual central processing units (vCPUs) of the VM is agreed upon by both the host machine and the VM. In Example 38, the subject matter of Examples 35-37 can optionally include wherein a change to the mapping of the HASIDs to the groups of vCPUs is synchronized between the host machine and the VM.

Example 39 is an apparatus for implementing HASIDs for NUMA locality in VMs comprising means for receiving execution control from the VM, wherein a page fault corresponding to a guest physical address (GPA) triggered an exit to the hypervisor from the VM, means for referencing a NUMA node locality table with the GPA determine a memory page and virtual NUMA node associated with the GPA, means for determining, in view of the HASID, whether to migrate the memory page associated with the GPA to a host NUMA node corresponding to the virtual NUMA node, and means for creating a new page table entry for the GPA in a host page table of the hypervisor. In Example 40, the subject matter of Example 39 can optionally include the apparatus further configured to perform the method of any one of the Examples 1 to 38.

Example 41 is a non-transitory computer-readable medium for implementing polymorphism and type casting in storage volume connections. In Example 41, the non-transitory machine-readable medium includes instructions that, when executed by a processing device, cause the processing device to determine, by a virtual machine (VM) executed by the processing device and managed by a hypervisor of the system, that a memory page of the VM should be moved from a first virtual non-uniform memory access (NUMA) node of the VM to a second virtual NUMA node of the VM, and reference a NUMA node locality table to identify an offset associated with a host address space identifier (HASID) corresponding to the second virtual NUMA node with the second virtual NUMA node. Further to Example 41, the instruction additionally cause the processing device to adjust an address of the memory page by the offset, store the adjusted address as a guest physical address (GPA) for the memory page in a guest page table of the VM, attempt to access the GPA for the memory page, and responsive to a page fault resulting from attempting to access the GPA, exit from the guest to the hypervisor.

In Example 42, the subject matter of Example 41 can optionally include wherein the hypervisor maintains an identical version of the NUMA node locality table to reference with the GPA in order to determine the memory page and virtual NUMA node associated with the GPA. In Example 43, the subject matter of Examples 41-42 can optionally include wherein mapping of HASIDs to groups of virtual central processing units (vCPUs) of the VM is agreed upon by both the host machine and the guest. In Example 44, the subject matter of Examples 41-443 can optionally include wherein a change to the mapping of the HASIDs to the groups of vCPUs is synchronized between the host machine and the VM.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "removing," "copying," "storing," "broadcasting," "reassigning," "storing," "allocating," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   determining, by a virtual machine (VM) executed by a processing device and managed by a hypervisor, wherein the virtual machine comprises a set of virtual non-uniform memory access (NUMA) nodes, wherein each virtual NUMA node comprises a set of set of virtual CPUs (vCPUs) and a set of guest memories, and wherein each virtual NUMA node individually maps to a physical host NUMA node, that a memory page of a guest is to be moved from a first virtual NUMA node of the VM to a second virtual NUMA node of the VM;
   updating, by the VM in a guest page table of the VM, designated bits of a guest physical address (GPA) of the memory page to include a host address space identifier (HASID) of the second virtual NUMA node, wherein the guest page table maps the GPA of the memory page to a corresponding guest virtual address (GVA) of the VM and wherein the HASID associates the GPA of the memory page with a corresponding virtual NUMA node locality; and
   causing an execution control to be transferred from the VM to the hypervisor due to a page fault resulting from attempting to access the updated GPA.

2. The method of claim 1, wherein the HASID is included in a determined number of the designated bits of the GPA, and wherein an address portion of the GPA is maintained in other bits of the GPA separate from the HASID.

3. The method of claim 1, wherein the HASID comprises a virtual NUMA node indicated by the VM to associate with the GPA, and wherein the virtual NUMA node is different than a current virtual NUMA node associated with the GPA.

4. The method of claim 1, further comprising:
   mapping a plurality of HASIDs to groups of virtual central processing units (vCPUs) of the VM.

5. The method of claim 4, further comprising:
   notifying the hypervisor of the mapping of plurality of HASIDs to the groups of vCPUs of the VM.

6. The method of claim 4, further comprising:
   modifying the mapping of plurality of HASIDs to the groups of vCPUs of the VM; and
   notifying the hypervisor of the modified mapping of plurality of HASIDs to the groups of vCPUs of the VM.

7. The method of claim 1, further comprising:
   receiving, from the hypervisor, a mapping of a plurality of HASIDs to groups of virtual central processing units (vCPUs) of the VM; and
   synchronizing, with the hypervisor, changes to the mapping of plurality of HASIDs to the groups of vCPUs of the VM.

8. A system comprising:
   a memory; and
   a processing device, coupled to the memory, to:
   receive execution control from a virtual machine (VM) executed by the processing device and managed by a hypervisor, wherein the virtual machine comprises a set of virtual non-uniform memory access (NUMA) nodes, wherein each virtual NUMA node comprises a set of set of virtual CPUs (vCPUs) and a set of guest memories, and maps to a physical host NUMA node, wherein a page fault corresponding to a guest physical address (GPA) triggered an exit to the hypervisor from the virtual machine;
   reference a NUMA node locality table using the GPA to determine a memory page and a virtual NUMA node associated with the GPA using a host address space identifier (HASID) that associates the GPA of the memory page with a corresponding virtual NUMA node locality;
   determine whether to migrate the memory page associated with the GPA to a host NUMA node corresponding to the virtual NUMA node; and
   create a new page table entry for the GPA in a host page table of the hypervisor, wherein the host page table maps the GPA of the memory page to a corresponding host physical address.

9. The system of claim 8, wherein the processing device is further to:
   identify the HASID from the GPA, wherein the HASID is used to determine whether to migrate the memory page to the host NUMA node corresponding to the virtual NUMA node.

10. The system of claim 9, wherein the HASID is maintained in a determined number of upper bits of the GPA, wherein an address portion of the GPA is maintained in lower bits of the GPA separate from the HASID.

11. The system of claim 9, wherein to identify the HASID, the processing device is to:
    identify a host physical address and the HASID in the NUMA node locality table.

12. The system of claim 9, wherein the HASID corresponds to an offset used to adjust the GPA.

13. The system of claim 12, wherein adjusting the GPA with the offset causes the GPA to reside outside of a range of memory addresses accessed by the virtual machine.

14. A non-transitory computer-readable storage medium including instructions that, when executed by a processing device of a host machine, cause the processing device to:
    determine, by a virtual machine (VM) executed by the processing device and managed by a hypervisor, wherein the virtual machine comprises a set of virtual non-uniform memory access (NUMA) nodes, wherein each virtual NUMA node comprises a set of set of virtual CPUs (vCPUs) and a set of guest memories, and wherein each virtual NUMA node individually maps to a physical host NUMA node, that a memory page of a guest is to be moved from a first virtual NUMA node of the VM to a second virtual NUMA node of the VM;
    reference a NUMA node locality table to identify an offset corresponding to the second virtual NUMA node using a host address space identifier (HASID) that associates a guest physical address (GPA) of the memory page with a corresponding virtual NUMA node locality;
    adjust the GPA of the memory page by the offset;
    store the adjusted address as the GPA for the memory page in a guest page table of the VM, wherein the guest page table maps the GPA of the memory page to a corresponding guest virtual address (GVA) of the VM; and cause an execution control to be transferred from the VM to the hypervisor due to a page fault resulting from attempting to access the GPA for the memory page.

15. The non-transitory computer-readable storage medium of claim 14, wherein the offset is associated with the HASID corresponding to the second virtual NUMA node.

16. The non-transitory computer-readable storage medium of claim 15, wherein the HASID is included in a determined number of upper bits of the GPA, and wherein an address portion of the GPA is maintained in lower bits of the GPA separate from the HASID.

17. The non-transitory computer-readable storage medium of claim 15, wherein the HASID comprises a virtual NUMA node indicated by the VM to associate with the GPA, and wherein the virtual NUMA node is different than a current virtual NUMA node associated with the GPA.

18. The non-transitory computer-readable storage medium of claim 15, wherein an identical version of the NUMA node locality table is maintained by the hypervisor to reference with the GPA and to determine the memory page and the second virtual NUMA node associated with the GPA.

19. The non-transitory computer-readable storage medium of claim 18, wherein mapping of HASIDs to groups of virtual central processing units (vCPUs) of the VM is agreed upon by the hypervisor and the VM.

20. The non-transitory computer-readable storage medium of claim 19, wherein a change to the mapping of the HASIDs to the groups of vCPUs is synchronized between the hypervisor and the VM.

* * * * *